United States Patent Office 3,319,158
Patented May 9, 1967

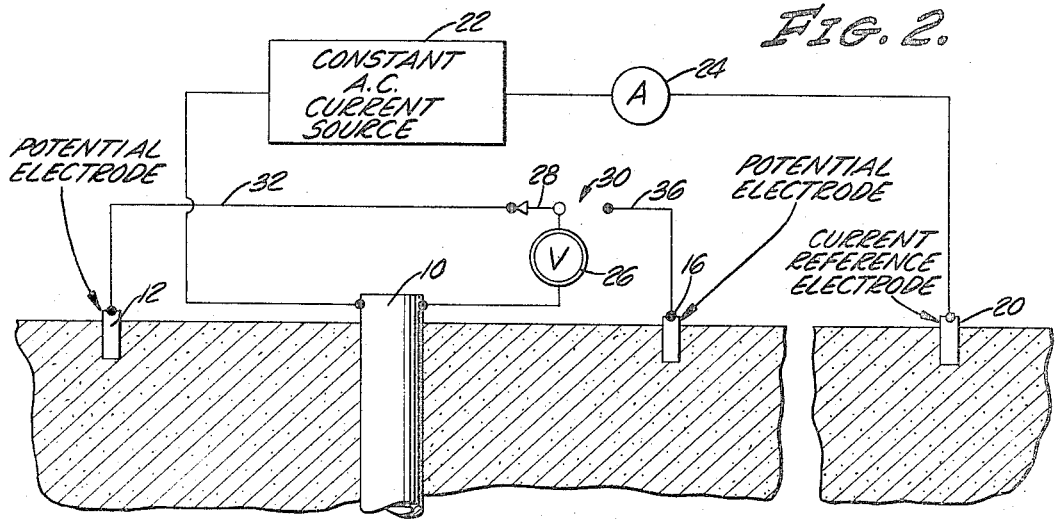
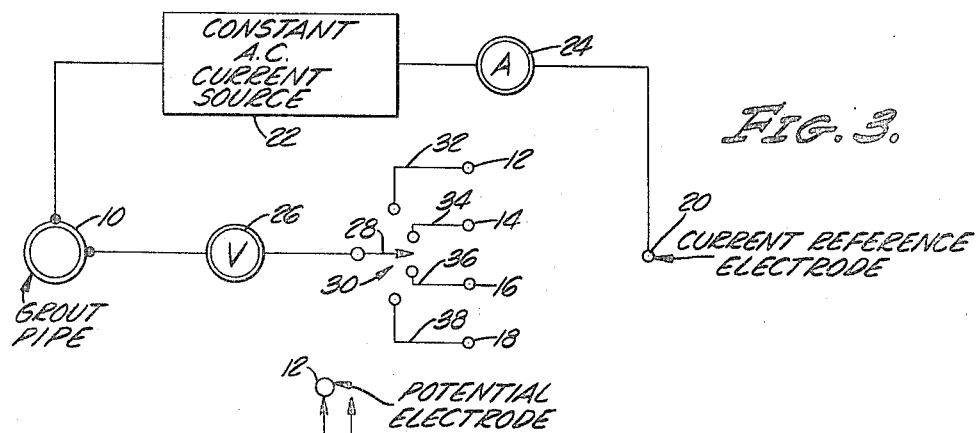
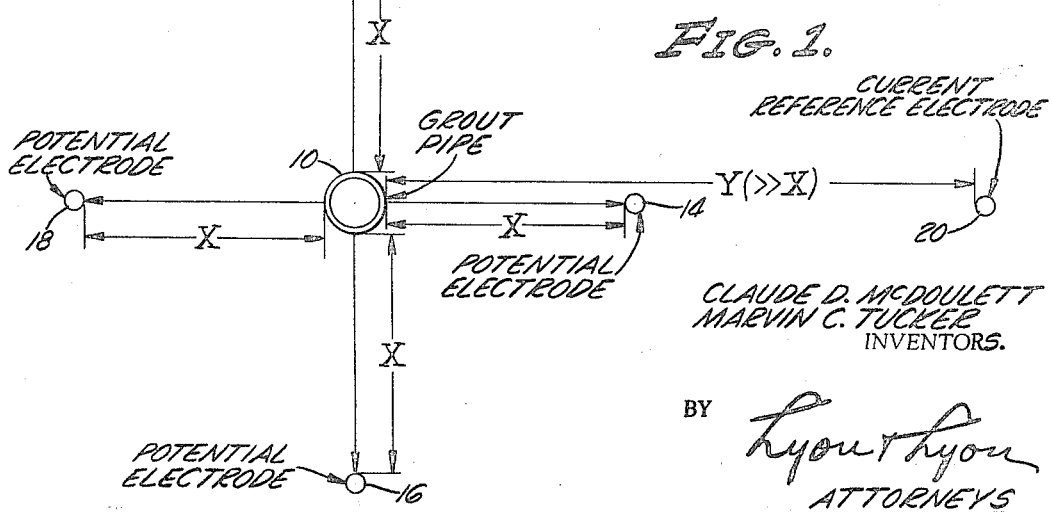

3,319,158
METHOD OF TRACING GROUT IN EARTH FORMATIONS BY MEASURING POTENTIAL DIFFERENCES IN THE EARTH BEFORE AND AFTER INTRODUCTION OF THE GROUT
Claude D. McDoulett and Marvin C. Tucker, Duncan, Okla., assignors to Halliburton Company, Duncan, Okla., a corporation of Delaware
Filed July 9, 1964, Ser. No. 381,473
3 Claims. (Cl. 324—9)

This invention relates to a method and system for determining the distribution of grout around an injection well.

When injecting grout through a pipe into an earth formation, it is desirable to trace the relative distribution of grout around the pipe while it is being injected into the formation. Various methods of grout tracing and electrical systems for carrying them out have been proposed. The most common such system presently in use consists of a plurality of four electrode systems distributed about the grout hole in a predetermined pattern. Each of the four electrode systems comprises a pair of current electrodes spaced relatively distant from the grout hole on opposite sides thereof and a pair of potential electrodes aligned with the current electrodes and the grout hole and positioned considerably closer to the grout hole than the current electrodes.

A constant A.C. current is supplied to the current electrodes and an A.C. millivolt meter is connected to the potential electrodes. Generally, three such four-electrode systems are required to adequately cover the 360° around the grout pipe. Such a system requires sixteen lead cables and electrodes, and satisfactory operation is obtained only by spacing the current electrodes at least forty feet from the grout pipe.

Since it is often necessary to carry out a grouting operation within narrow confines, a conventional four-electrode system is frequently not usable, at least in its most accurate manner. Moreover, it is often difficult, as well as uneconomical, to transport the number of cables of the length required to the site of the grouting operation. It has also been found that the sensitivity of the four-electrode system is quite low and requires a substantial resistivity contrast between the grout and the formation fluid before meaningful results can be obtained.

It is therefore an object of the present invention to provide a system for tracing the distribution of grout around a grouting hole that requires less equipment and can be set up in a smaller area than has heretofore been possible.

It is also an object of the present invention to provide such a system in which only one electrode need be spaced a substantial distance from the grout hole and in which the grout pipe itself is used as an electrode.

It is another object of the present invention to provide such a system which is extremely sensitive and which permits the use of grout having a resistivity relatively close to that of the formation fluid.

It is a still further object of the present invention to provide an improved method for tracing the distribution of grout around a grout hole.

These and other objects and advantages of the present invention will become more apparent upon reference to the accompanying description and drawings in which:

FIGURE 1 is a diagrammatic plan view showing the disposition of the electrodes of the system of the present invention;

FIGURE 2 is a diagrammatic representation of the system of the present invention; and FIGURE 3 is a schematic diagram of the electrical system of the present invention.

Referring now to FIGURE 1, a grout pipe 10 is shown surrounded by a plurality of electrodes 12, 14, 16 and 18 which serve as potential electrodes in the system of the present invention. These electrodes are preferably angularly spaced at 90° intervals around the grout pipe and are spaced from the grout pipe by a distance X. A further electrode 20 is spaced from the grout pipe 10 by a distance Y which is much greater than the distance X. The electrode 20 serves as a current reference electrode in the circuit while the grout pipe 10 itself serves as the common potential and current electrode of the system.

As can be seen in FIGURES 2 and 3, the grout pipe 10 is connected to one terminal of a source 22 of constant A.C. current. The other terminal of the source 22 is connected through an ammeter 24 to the current reference electrode 20. The grout pipe 10 is also connected to one terminal of a millivolt meter 26, the other terminal of which may be connected to any of the potential electrodes 12, 14, 16 and 18 by means of the movable arm 28 of a switch 30 which selectively engages contacts coupled by cables 32, 34, 36 and 38 to the potential electrodes.

After the system has been set up, an A.C. current controlled at a predetermined constant value is applied to the combination current and potential reference electrode 10 and the current reference electrode 20 and passed through the earth formation between them. The current in the formation creates a potential difference between the electrode 10 and the potential electrodes 12, 14, 16 and 18 spaced around the electrode or grout pipe 10.

By means of the switch 30, base readings are obtained and recorded from each of the four electrodes 12, 14, 16 and 18 prior to injecting grout into the zone to be consolidated. In most cases, the grout will be more conductive than the formation fluid and in such cases the millivolt readings between the electrodes as indicated by the millivolt meter 26 will decrease as the grout displaces the formation fluid in the zone being consolidated. Since these readings are taken between the grout pipe in the center of the system and the potential electrode spaced equally around it, the change in readings per pair of electrodes will indicate the direction and magnitude of travel of the grout. This signal can be read and recorded manually or can be continuously recorded by a series of suitable recorders.

In a test of the system described above, the potential electrodes 12, 14, 16 and 18 were spaced 8 ft. from the grout pipe 10 and the current reference electrode 20 was spaced 160 ft. from the grout pipe. Before the grout injection was begun, a constant A.C. current of 1 amp was passed through the formation between the electrodes 10 and 20 and the potentials at the various electrodes 12, 14, 16 and 18 were measured at 305, 300, 310 and 310 millivolts, respectively. The formation fluid was determined to have a resistivity of 5 ohm-meters and the grout, which was of the type disclosed in assignee's copending application Ser. No. 187,951, filed Apr. 16, 1962, now Patent No. 3,223,163, was determined to have a resistivity of 1.58 ohm-meters. The grout injection depth was 35.6 ft. to 39.0 ft. It was determined theoretically before the grout was injected that 60 gallons of grout would be necessary to form a consolidated cylinder 4.5 ft. in diameter through the sand in the formation.

After the sixty gallons of grout were injected, the potential at electrode 12 had been reduced to 292 millivolts, at electrode 14 to 282 millivolts, at electrode 16 to 297 millivolts and at electrode 18 to 298 millivolts. The total change was thus 56 millivolts with 23.2 percent occurring at electrode 12, 32.2 percent occurring at electrode 14, 23.2 percent occurring at electrode 16 and 21.4 percent at electrode 18. From these values it can be calculated that the grout extends 2.1 ft. from grout pipe 10 towards potential electrode 12, 2.56 ft. towards potential electrode 12, 2.18 ft. towards potential electrode 16, and 2.08 ft. towards potential electrode 18.

From the foregoing description, it can be seen that a system and method have been provided for tracing the distribution of grout around a grout injection pipe. The system permits the use of fewer components than has heretofore been possible and provides a higher sensitivity, thus allowing the use of a grout having a resistivity relatively close to that of the formation fluid.

While the system has been described solely in terms of determining grout distribution, it should be obvious to those skilled in the art that it could also be used to determine the extent of other changes in resistivity taking place about a given reference electrode, or to determine the distribution of other substances, for example, a fracturing fluid, introduced into an earth formation. It should also be obvious that more or less potential electrodes may be used if circumstances warrant.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method of determining the distribution of a substance introduced into an earth formation having a resistivity different from that of said substance, comprising: passing a constant current through said earth formation between the point of substance introduction and a point remote from said introduction point, measuring the potential difference between said introduction point and a point much closer to said introduction point than to said remote point, introducing said substance into the earth formation, and again measuring the potential difference between said introduction point and said closer point.

2. A method of determining the distribution of a substance introduced into an earth formation having a resistivity different from that of said substance, comprising: passing a constant alternating current through said earth formation between the point of substance introduction and a point remote from said introduction point, measuring the potential difference between said introduction point and each of a plurality of other points spaced around said introduction point and positioned much closer to said introduction point than to said remote point, introducing said substance into the earth formation, and again measuring the potential difference between said introduction point and said spaced points.

3. A method for tracing the distribution of grout introduced through a grout pipe into an earth formation having a resistivity different from that of the earth formation, comprising: passing a constant alternating current through said earth formation between said grout pipe and a point remote from said grout pipe, measuring the potential difference between said grout pipe and each of a plurality of points equally spaced from said grout pipe and covering 360° around said grout pipe, said spaced points being positioned much closer to said grout pipe than to said remote point, introducing a known amount of grout into said formation through said pipe, and again measuring the potential difference between said grout pipe and said spaced points, the change in voltage between said second readings and said first readings indicating the distance the grout has traveled through said formation toward each of said spaced points.

References Cited by the Examiner

UNITED STATES PATENTS

| | | | |
|---|---|---|---|
| 2,181,601 | 11/1939 | Jakosky | 324—1 X |
| 2,192,404 | 3/1940 | Jakosky | 324—64 X |
| 2,211,124 | 8/1940 | Jakosky | 324—1 X |
| 2,440,693 | 5/1948 | Lee | 324—1 |
| 2,459,196 | 1/1949 | Stewart | 324—1 |
| 2,575,349 | 11/1951 | Lee | 324—1 |
| 2,625,374 | 1/1953 | Neuman | 324—10 X |
| 3,134,941 | 5/1964 | Norelius | 324—1 |

WALTER L. CARLSON, *Primary Examiner.*

G. R. STRECKER, *Assistant Examiner.*